United States Patent [19]

Nemirovsky et al.

[11] Patent Number: 5,216,591
[45] Date of Patent: Jun. 1, 1993

[54] METHOD FOR EFFICIENT DISTRIBUTED DATA COMMUNICATIONS NETWORK BACKBONE NODE LOCATION

[75] Inventors: Paul Nemirovsky, Rockville; Michael Ball, Silver Spring; Roy Dahl, Greenbelt, all of Md.

[73] Assignee: Sprint International Communications Corp., Reston, Va.

[21] Appl. No.: 475,887

[22] Filed: Feb. 6, 1990

[51] Int. Cl.5 .............................................. H04J 15/00
[52] U.S. Cl. .................... 364/401; 364/402; 370/16; 370/17; 370/94.1; 395/200; 395/909
[58] Field of Search ................... 364/401, 402; 370/16, 370/17, 94.1, 94.3; 395/200, 909

[56] References Cited

U.S. PATENT DOCUMENTS 4,956,835  9/1990  Grover ................................ 370/16
5,014,262  5/1991  Paramasiv ........................... 370/16

Primary Examiner—Roy N. Envall, Jr.
Assistant Examiner—Gita D. Shingala
Attorney, Agent, or Firm—Kenyon & Kenyon

[57] ABSTRACT

A method for selecting the most cost-efficient locations for backbone nodes in a distributed data network is disclosed. The method iteratively evaluates candidate backbone node locations, adding in each iteration the candidate whose addition to the network would create the greatest savings in total network cost. After all candidates which produce savings are added to the network, the method iteratively evaluates the backbone node locations and removes those whose removal would create cost savings. Data terminals are reassigned among the backbone nodes in the least cost manner. The method also estimates total network cost based on the resulting network configuration.

11 Claims, 7 Drawing Sheets

FLOW CHART OF A METHOD FOR EFFICIENT DISTRIBUTED
DATA COMMUNICATIONS NETWORK BACKBONE NODE LOCATION

Backbone Sites v2.2

| Loc ID | Dev | Node Num. | Cost | Avail | Exist | Chosen? Y/N | Chosen? Num | T1 Site Chos? Y/N | T1 Site Node Num | Switch | Number of Increments Fact | Number of Increments Line |
|---|---|---|---|---|---|---|---|---|---|---|---|---|
| ALMONT | BB | 5 | 4000.00 | O | N | N | | | | BB | | |
| CALANG | BB | 8 | 4000.00 | O | N | N | | | | BB | | |
| CAOAKL | BB | 7 | 4000.00 | O | N | N | | | | BB | | |
| COAURO | BB | 6 | 4000.00 | O | N | N | | | | BB | | |
| ILCHIC | BB | 4 | 4000.00 | O | N | N | | | | BB | | |
| MABOST | BB | 0 | 4000.00 | M | N | N | | | | BB | | |
| NJTREN | BB | 1 | 4000.00 | O | N | N | | | | BB | | |
| OHCINC | BB | 3 | 4000.00 | O | N | N | | | | BB | | |
| VARICH | BB | 2 | 4000.00 | O | N | N | | | | BB | | |

Design Switches: Page Down Key

Count: ★9

FIG. 4

Terminal/Host Clusters v2.0

| Cluster No. | Design ID | V Coord | H Coord | Cluster Weight |
|---|---|---|---|---|

Design Location v2.0

| Clust# | Loc ID | V Coord | H Coord | Lata | St | Vir | Term | T/H | Flag: | Conc. | BackB |
|---|---|---|---|---|---|---|---|---|---|---|---|
| 0 | ALBIRM | 7518 | 2446 | 476 | AL | | 0 | Y | | 0 | 0 |
| 0 | ALMONT | 7692 | 2247 | 478 | AL | | 0 | Y | | 0 | 0 |
| 0 | ARLROC | 7721 | 3448 | 528 | AR | | 0 | Y | | 0 | 0 |
| 0 | AZPHOE | 9133 | 6748 | 666 | AZ | | 0 | Y | | 0 | 0. |
| 0 | AZTUCS | 9347 | 6469 | 668 | AZ | | 0 | Y | | 0 | 0 |
| 0 | CAFRES | 8669 | 8239 | 728 | CA | | 0 | Y | | 0 | 0 |

Terminal/Host Traffic v2.0

| Source: Loc ID | Dev ID | Dest: Loc ID | Dev ID | Peak Byte | Profile ID |
|---|---|---|---|---|---|
| ALBIRM | T | CALANG | H | 61.5 | 1 |
| ALBIRM | T | DCWASH | H | 61.5 | 1 |
| ALMONT | T | CALANG | H | 209.6 | 1 |

Enter in peak byte traffic.
Char Mode: Replace Page 1

Count: 3

FIG. 5

Backbone Sites v2.2

| Loc ID | Dev | Node Num. | Cost | Avail | Exist | Chosen? Y/N | Num | T1 Site Chos? Y/N | Node Num | Switch | Number of Increments Fact | Line |
|---|---|---|---|---|---|---|---|---|---|---|---|---|
| ALMONT | BB | 0 | 4000.00 | 0 | N | N | | | | BB | | |
| ILCHIC | BB | 4 | 4000.00 | 0 | N | N | | | | BB | | |
| MABOST | BB | 5 | 4000.00 | 0 | N | N | | | | BB | | |
| VARICH | BB | 8 | 4000.00 | 0 | N | N | | | | BB | | |
| CALANG | BB | 1 | 6000.00 | 0 | N | Y | 4 | | | BB | 1 | 1 |
| CAOAKL | BB | 2 | 6000.00 | 0 | N | Y | 3 | | | BB | 1 | 1 |
| COAURO | BB | 3 | 6000.00 | 0 | N | Y | 2 | | | BB | 1 | 1 |
| NJTREN | BB | 6 | 6000.00 | M | N | Y | 0 | | | BB | 1 | 1 |
| OHCINC | BB | 7 | 6000.00 | 0 | N | Y | 1 | | | BB | 1 | 1 |

Design Switches: Page Down Key

Char Mode: Replace Page 1          Count: ★9

FIG. 7

METHOD FOR EFFICIENT DISTRIBUTED DATA COMMUNICATIONS NETWORK BACKBONE NODE LOCATION

FIELD OF THE INVENTION

This invention relates generally to distributed data communication networks and, more specifically, to a method for selecting the most cost-efficient locations for backbone nodes in a distributed data network.

BACKGROUND OF THE INVENTION

The design of distributed data network topologies has been practiced for many years. A distributed data communication network is a hierarchical system of hardware components arranged to connect each hardware device, directly or indirectly, to every other device. At the lowest level in the hierarchy are user terminals or host devices, which form part of the local access network. These terminals are linked to one or more concentrators, which are statistical multiplexers with several low data rate input data lines and fewer high data rate output data lines. The concentrators form the second level of the network hierarchy and, together with the terminals, form the local access network.

The concentrators, which may be connected to other concentrators in a hierarchical fashion, are ultimately connected to the backbone, which forms the highest level in the network hierarchy. The backbone consists of high data capacity lines that terminate at backbone nodes, the latter including one or more devices including a switching device for routing traffic within the backbone. Data traffic from the concentrators enters the backbone at the backbone nodes.

Systems for constructing the most efficient arrangement of nodes on the backbone have been so generic as not to accommodate all of the parameters typically used in the communications industry. Other approaches have been so narrowly focused as to render the system relatively inflexible. The invention described herein overcomes the deficiencies with a unique system that permits greater facility for arriving at a particular node construction. Although certain assumptions are made with respect to local access cost and node capacity, the user is given great flexibility in varying many other parameters which control the node construction.

SUMMARY OF THE INVENTION

The present invention is directed to a method used to determine backbone node locations in a distributed data network that overcomes the limitations of the prior art. More specifically, the invention is composed of a personal computer-based software tool used to aid in the location of backbone nodes in distributed data communication networks that make use of equipment provided by Telenet Communications Corporation as well as similar equipment from other vendors. These networks include the Telenet Public Data Network, private networks that employ Telenet equipment, and hybrid networks that contain both privately-owned components and public data network equipment.

The invention selects a set of backbone node locations to meet performance requirements in the most efficient manner. It uses as inputs candidate backbone node locations, data terminal locations, and data traffic between those terminals. The cost of the backbone (backbone node switch hardware and backbone link data line costs) is compared to the cost of the local access network (terminal-to-backbone node line costs). Both the backbone and local access network costs are approximated. The invention can also accommodate a partial list of backbone locations which have been chosen by the user and select the remaining sites. In another mode of operation, the user can specify all node locations and have the performance of the backbone evaluated. The various modes of operation can be compared by incrementally adding or deleting nodes from the backbone.

The above is a brief discussion of some of the prior art and features of the invention. Other advantages of the invention can be gleaned from the detailed discussion of the preferred embodiment that follows.

BRIEF DESCRIPTION OF THE DRAWINGS

FIG. 4 is a tabular presentation of information about candidate backbone nodes in the network configuration shown in FIG. 3.

FIG. 5 is a tabular presentation of information about some of the data terminals in the network configuration shown in FIG. 3;

FIG. 7 is a tabular presentation of the network topology shown graphically in FIG. 6.

DETAILED DESCRIPTION OF THE PREFERRED EMBODIMENT

Figure 1:
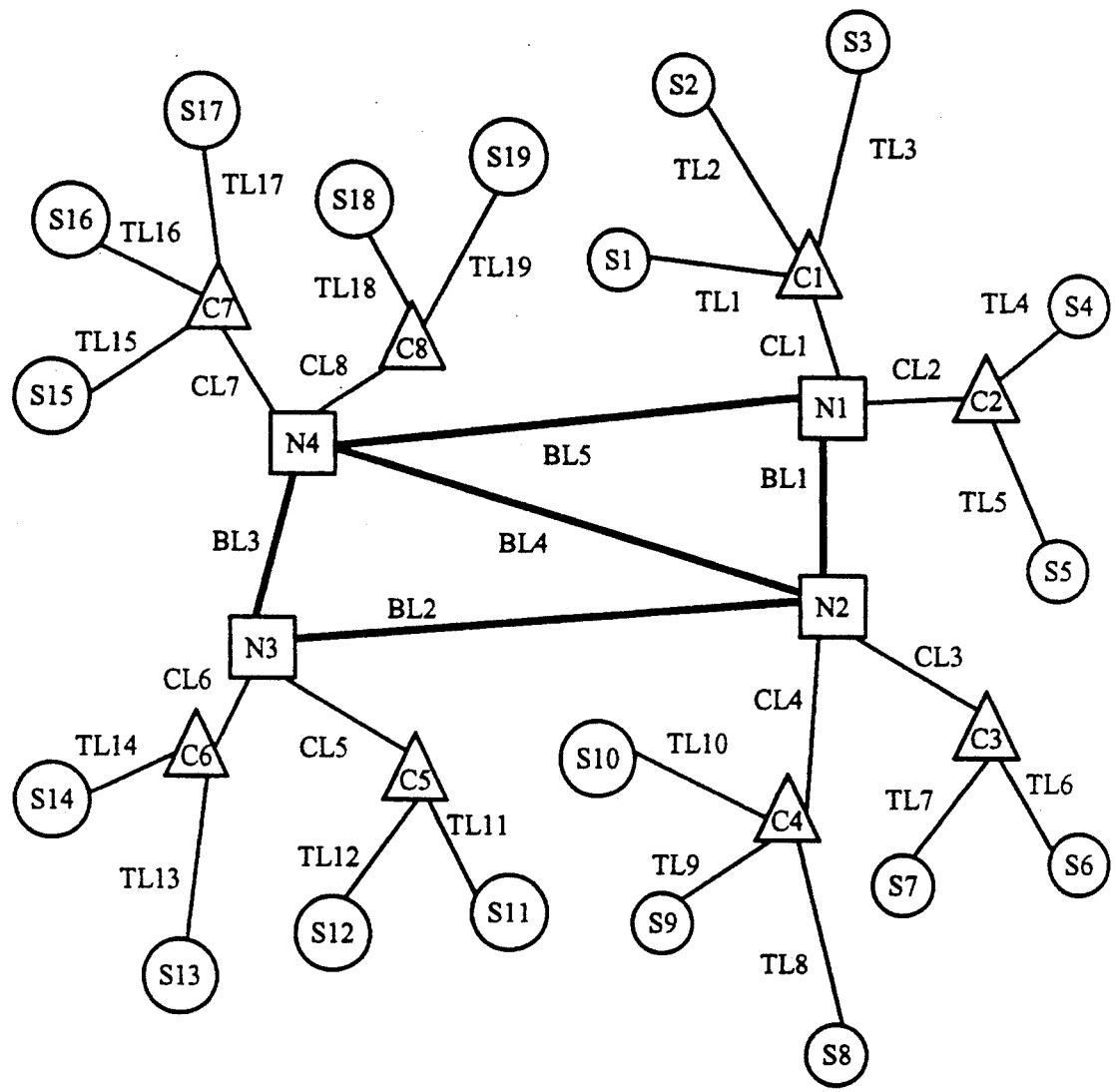
FIG. 1 is a diagram depicting a distributed data communications network comprising terminals, concentrators, and backbone nodes and the data line links connecting those devices.

In describing an illustrative embodiment, it is helpful in conveying the principles of the present invention to consider the specific network depicted in FIG. 1. Although this network is less complex than those encountered in practice, the small size of the network allows for brevity of description without loss of generality. The network includes a set of interconnected data terminals $S_1$–$S_{19}$; a variety of terminals can be used. The terminals are connected to concentrators $C_1$–$C_8$ which are statistical multiplexers such as one of the Telenet Communications Corporation model number TP 3000 series multiplexers. The concentrators are in turn connected to backbone nodes $N_1$ to $N_4$; the backbone nodes contain data switches such as a Telenet Communications Corporation TP4/III series switch.

The links $TL_1$–$TL_{19}$ between the terminals and the concentrators are data lines leased from local telephone service providers, as are the links $CL_1$–$CL_8$ between the concentrators and backbone nodes. The backbone nodes are connected by backbone data link lines $BL_1$–$BL_5$, which are high-volume leased data lines such as T1 fiber optic lines leased from a long-distance telephone service provider such as U.S. Sprint. The backbone nodes N and the backbone links BL collectively form the backbone of the data communications network. The terminals S, concentrators C, and data links TL and CL collectively form the local access network. Data is transmitted between the terminals S through the backbone and the local access network. The amount of data which flows per unit time through the network from one terminal to another terminal is the traffic volume T between the terminals.

In establishing a network the goal is the most efficient selection of components to maximize service at the lowest cost. The cost of establishing the network shown in FIG. 1 can be divided into the cost of the backbone and the cost of the local access network. The cost of the backbone includes the cost of the switches located at the backbone nodes and the cost of the backbone links BL. The cost of the local access network consists of the cost of concentrators C and data links TL and CL. The invention is a method for determining that set of backbone node locations N which will have the least cost combination of backbone costs and local access network costs based on a set of candidate backbone node locations NC, terminals S, and traffic volumes T from those terminals.

The hardware components shown schematically in FIG. 1 can represent a variety of hardware devices. Each terminal $S_i$ can also represent a virtual terminal composed of an aggregate of more than one physical terminal. In general, a single physical location may have more than one hardware device. Similarly, a backbone node $N_i$ can consist of more than one hardware device, having in addition to a switch such other devices as concentrators. The links CL, TL, and BL can be analog or digital transmission lines.

To configure the network, the locations of the terminals, the traffic volume between the terminals, and the possible locations of backbone nodes must be known. Each terminal location can be a potential backbone node location, specified either as an optional site NC or as a mandatory site NM. The locations of the terminals in the network can be fixed in a two-axis coordinate system by specifying their locations in standard AT&T V,H coordinates or as area code/exchange locations. The traffic volumes between the terminals can be specified in the user-chosen form of bytes/second, packets/-second, and calls/second.

Figure 2:
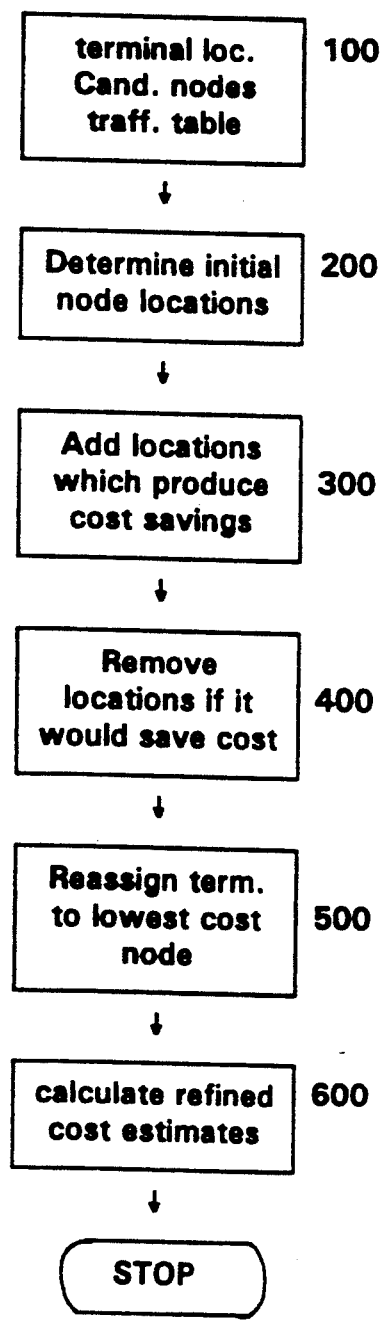
FIG. 2 is a flow chart diagram of the steps of the invention.

The logical flow of the method is illustrated schematically in FIG. 2. The method works in an incremental fashion. At each stage of the node location process, each terminal $S_i$ is associated with one of the backbone nodes already selected. Initially, all mandatory nodes are included and each terminal $S_i$ is associated with the node physically closest to the terminal. If no mandatory nodes are specified, the candidate node $NC_i$ closest to the unweighted center of mass of all of the terminals is selected and all of the terminals $S_i$ are associated with that candidate node. This step in the method is shown in step 200 of FIG. 2.

The next step of the method is an add phase. Each candidate node $NC_i$ not yet selected is evaluated for addition to the backbone. Node $N_i$ will be added, and therefore terminals associated with the switch at that location, if the addition of that location produces a positive savings $SAV_i$.

The savings $SAV_i$ associated with adding a candidate node $NC_i$ can be expressed as:

$$SAV_i = ST_i - CB_i - CS_i$$

where $ST_i$ is the savings in local access network costs, $CB_i$ is the change in the cost of the backbone attributed to adding node $NC_i$, and $CS_i$ is the cost of adding a switch at node $NC_i$.

$ST_i$ is the total savings associated with reassigning all those terminals which would be more cheaply assigned to a switch at candidate node $NC_i$ than to the switch to which they are currently assigned. The cost of assigning a terminal $S_i$ to a switch at node $N_i$ is based on the exact or approximate cost of leasing a direct line from a telephone service provider to connect the terminal location to the node location. The cost of leasing the line from the service provider is determined from the standardized tariff that the provider charges to supply a line of the required data-carrying capacity over the required distance. The providers' tariffs are generally monotonically increasing as a function of distance, so the method assumes that positive savings will always result from assigning a terminal to the node location which is physically closest to the terminal.

$CB_i$ is an estimate in the change in the cost of the backbone associated with adding candidate node $NC_i$ to the backbone. The cost of a given backbone topology can be estimated as the sum over all pairs of switches at the backbone nodes of the traffic between those switches times the cost of sending a unit of traffic between two switches. A table of traffic for backbone node switches can be constructed from the terminal traffic table by aggregating traffic from the terminals associated with each backbone node switch. This in turn can be modeled as a constant (detour factor) times the direct cost of connecting the two devices. Referring to FIG. 1, the cost of sending a unit of traffic between nodes $N_1$ and $N_3$ is estimated as the cost, based on the appropriate tariff of the applicable telephone service provider, of sending that traffic over the physical distance between the locations of those two nodes (based on an input data line speed) times a detour factor. This detour factor reflects the fact that, as is the case with nodes $N_1$ and $N_3$, the traffic cannot go directly from one node to the other, but must instead be routed through an intermediate node, such as $N_2$. The detour factor is set based upon assumptions as to the sparsity of the network and the expected utilization of the backbone links BL. The detour factor does not vary significantly since the network sparsity and link utilization are relatively constant among well-designed networks. The cost $CB_i$ of adding a candidate node $NC_i$ to the backbone is therefore the cost of the backbone as calculated above with the candidate node in the backbone less the cost of the backbone without the candidate node.

The invention employs a more efficient, estimated method for calculating the backbone cost with and without the candidate node. This method estimates the traffic $T_{ij}$ between backbone node switches i and j as:

$$T_{ij} = T_i T_j / T$$

where $T_i$ is the total traffic associated with the terminals associated with backbone node switch i and T is the total traffic in the network. This method is much less time consuming than making the pairwise calculations for each combination of backbone node switches. $CB_i$ can therefore be expressed as:

$$CB_i = F \Sigma_{j,k} \frac{\{D(j,k) [T(i+)jk - T(i-)jk]\}}{T}$$

where $T(i+)jk$ is the traffic from backbone node switch j to backbone node switch k assuming a switch at candidate node $NC_i$ is included while $T(i-)jk$ assumes $NC_i$ is not included, F is the detour factor, T is the total network traffic, and D(j,k) is the cost per unit traffic for transmitting data between backbone node switches j and k.

$CS_i$, the cost of adding a communication switch at candidate node location $NC_j$ is a fixed cost plus a cost per unit traffic times the total traffic (both traffic terminating at the switch and traffic transiting through the switch) associated with the candidate node.

The method iteratively evaluates the remaining candidate nodes, adding in each iteration the candidate node which provides the greatest savings. After a candidate node is added to the backbone, the next iteration evaluates the remaining candidate nodes with the newly added node as part of the backbone. Because the dominant savings associated with adding a node is the reduction in local network access cost, which decreases as the number of backbone nodes increases (because the average distance from sources to candidate nodes decreases), not all of the remaining candidate nodes need to be evaluated in each iteration. The candidates can be ranked by the amount of savings they produce in one iteration and the savings produced by the top ranked candidate in the current iteration is chosen unless its associated savings are lower than the savings of the next lower candidate in the preceding iteration. This iterative process is repeated until no candidate nodes remain whose addition would create positive cost savings. In those cases where no mandatory nodes were specified, terminals that have not been assigned to an added candidate node are assigned to the calculated center of mass node location.

The next phase in the method of the invention, as shown in step 400 of FIG. 2, is a drop phase. In this phase, the same calculations are made as in the add phase except that the method considers whether the removal of a backbone node could produce positive overall savings. It is possible that dropping a previously added candidate node could produce cost savings because the added node may have had some of its associated terminals reassigned to later-added node locations such that its remaining terminals are more cheaply assigned to other nodes. As with the add phase, the existing nodes are ranked in order of the magnitude of the savings from their removal as calculated in one iteration to reduce the number of nodes that must be considered in the following iteration.

The next step of the method, as shown in step 500 of FIG. 2, fixes the node locations remaining after the add and drop phases and reassigns each source to its best (cheapest) switch to minimize the total backbone cost. The switches are then resized as necessary to correspond to the sources assigned to the switch.

In the final step, as shown in step 600 of FIG. 2, the method prepares an estimate of the network cost.

Figure 3:
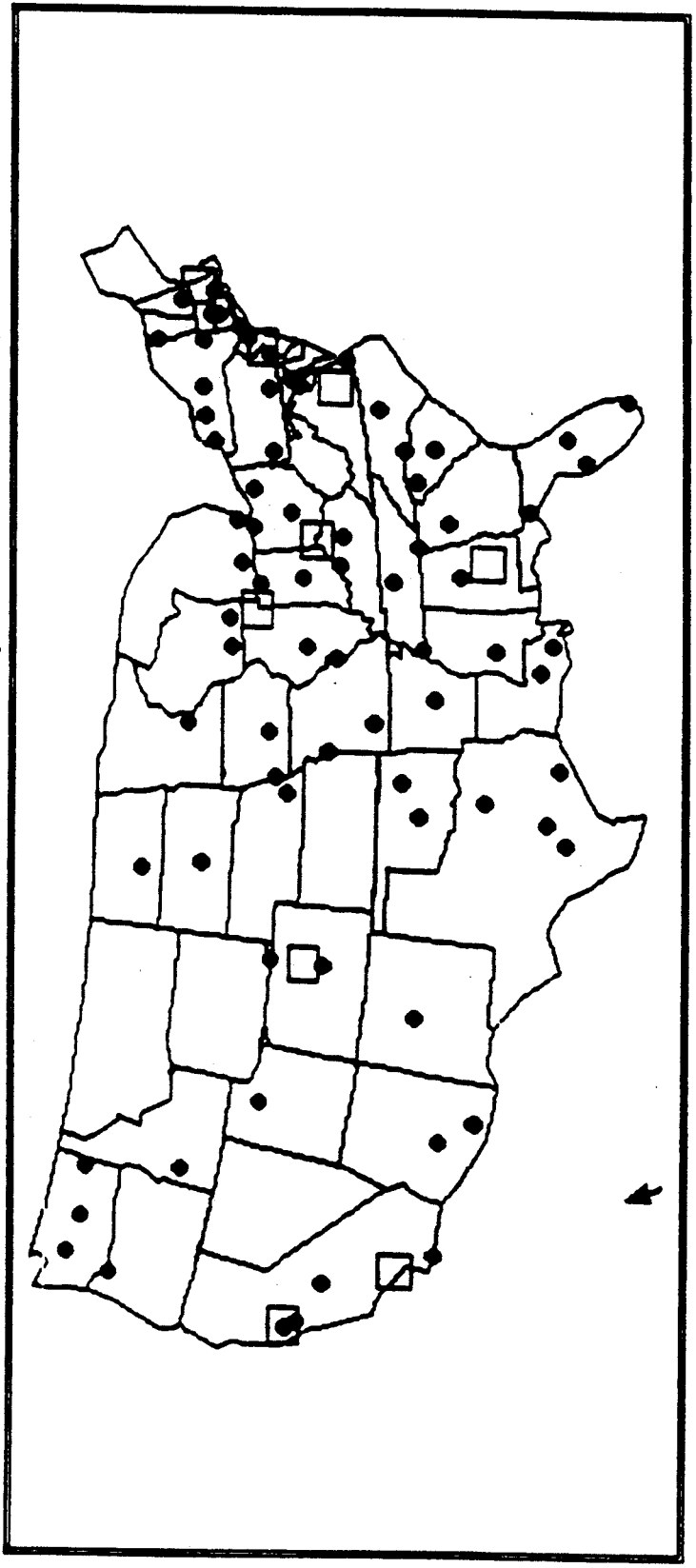
FIG. 3 is a diagram depicting a set of data terminals and candidate backbone node sites used as the basis for an example of the method's operation.

The operation of the method can be illustrated with an example. The example presented here is based on the network configuration shown in FIG. 3. This configuration includes a number of data terminals (shown as solid circles) and candidate backbone node sites (shown as hollow squares). Information about the candidate backbone nodes corresponding to the network shown in FIG. 3 is shown in tabular format in FIG. 4. Id. Information about several of the data terminals is shown in FIG. 5.

Figure 6:
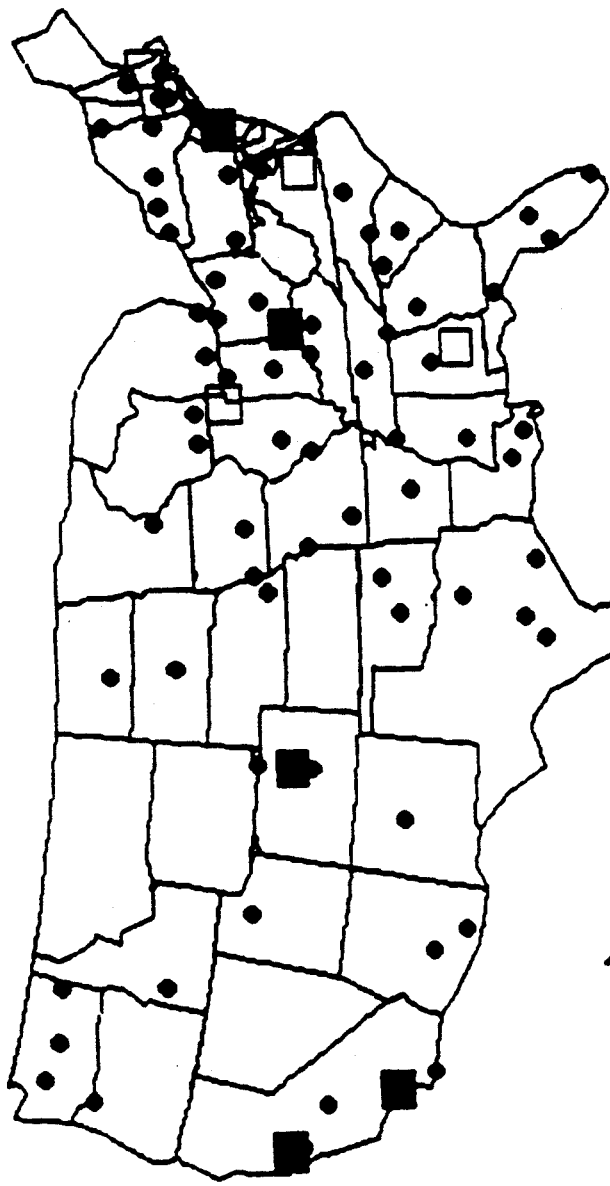
FIG. 6 is a diagram depicting the data terminals and candidate backbone node sites shown in FIG. 3 with the backbone node sites selected by the method.

Based on these inputs, the method of the invention configures the network shown in FIG. 6. Information about the selected backbone nodes is shown in tabular format in FIG. 7.

The preferred embodiment of the invention described above represents one desirable, workable embodiment of the invention. It is to be understood that the methodology described herein is not limited to specific forms disclosed by way of example and illustration, but may assume other embodiments and methods limited only by the scope of the appended claims and their equivalents.

What is claimed is:

1. A method for constructing a data communication network having;
    i) a local access network including a plurality of terminals; and
    ii) a backbone including backbone nodes for routing data traffic within the backbone and a plurality of first links connecting the backbone nodes, said method comprising steps of:
       (a) selecting mandatory backbone nodes related to various ones of said plurality of terminals;
       (b) selecting a new candidate backbone node for addition to the backbone;
       (c) evaluating the effect on the network of adding the new candidate backbone node to the backbone;
       (d) if the evaluation of step (c) indicates that effect on the network is positive, adding the new candidate backbone node to the backbone;
       (e) evaluating the effect of removing a backbone node from the backbone;
       (f) if evaluation of step (e) indicates that the effect on the network is positive, removing the backbone node from the backbone; and
       (g) reassigning terminals to backbone nodes included in the backbone to provide the lowest cost system to transmit data between said terminals.

2. The method for constructing a data communication network according to claim 1 further comprising repeating the steps (a) through (g) and selecting the lowest cost system to transmit data between said terminals.

3. The method for constructing a data communication network according to claim 1 wherein said backbone nodes include data switches.

4. The method for constructing a data communication network according to claim 1 wherein said first links are high volume data lines.

5. The method for constructing a data communication network according to claim 4 wherein said high volume data lines are fiber optic lines.

6. The method for constructing a data communication network according to claim 1 wherein said step of selecting a new candidate node includes substeps of:
    (i) measuring cost savings of the local access network;
    (ii) offsetting said measured savings by any increase in the cost of the backbone attributed to adding a new backbone node and adding a switch associated with the new backbone node; and
    (iii) evaluating cost savings of the network.

7. The method for constructing a data communication network according to claim 6 wherein the savings in local access network costs includes the savings associated with reassigning terminals to the candidate node.

8. A computer system for constructing a data communication network having;
    i) a local access network including a plurality of terminals; and
    ii) a backbone including backbone nodes for routing data traffic within the backbone and a plurality of first links connecting the backbone nodes, said computer system comprising:

(a) means for selecting mandatory backbone nodes related to various ones of said plurality terminals;

(b) means for selecting a new candidate backbone node for addition to the backbone;

(c) means for evaluating the effect on the network of adding the new candidate backbone node to the backbone;

(d) means for adding the new candidate backbone node if said means for evaluating determines that the effect on the network is positive;

(e) second means for evaluating the effect of removing a backbone node from the backbone;

(f) means for removing the backbone node if said second means for evaluating determines that the effect on the network is positive; and (g) means for reassigning terminals to backbone nodes to the backbone to provide the lowest cost system to transmit data between said terminals.

9. The computer system for constructing a data communication network according to claim 8 wherein said backbone modes include data switches.

10. The computer system for constructing a data communication network according to claim 8 wherein said first links are high volume data lines.

11. The computer system for constructing a data communication network according to claim 10 wherein said high volume data lines are fiber optic lines.

* * * * *